(12) United States Patent
Kim

(10) Patent No.: US 12,103,618 B2
(45) Date of Patent: Oct. 1, 2024

(54) STEERING CONTROL DEVICE AND METHOD THEREFOR, AND STEERING CONTROL SYSTEM

(71) Applicant: HL MANDO CORPORATION, Pyeongtaek-si (KR)

(72) Inventor: Tae Sik Kim, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 448 days.

(21) Appl. No.: 17/610,952

(22) PCT Filed: May 11, 2020

(86) PCT No.: PCT/KR2020/006178
§ 371 (c)(1),
(2) Date: Nov. 12, 2021

(87) PCT Pub. No.: WO2020/231128
PCT Pub. Date: Nov. 19, 2020

(65) Prior Publication Data
US 2022/0242482 A1    Aug. 4, 2022

(30) Foreign Application Priority Data
May 16, 2019   (KR) .................. 10-2019-0057367

(51) Int. Cl.
*B62D 6/04*   (2006.01)
*B62D 3/12*   (2006.01)
(Continued)

(52) U.S. Cl.
CPC ............. *B62D 6/04* (2013.01); *B62D 3/12* (2013.01); *B62D 5/0463* (2013.01); *B62D 15/0205* (2013.01); *B62D 15/0215* (2013.01)

(58) Field of Classification Search
None
See application file for complete search history.

(56) References Cited

U.S. PATENT DOCUMENTS 6,203,432 B1 *   3/2001   Roberts ................. A63F 13/803
                                                      463/36
2008/0211651 A1 *  9/2008  Beutnagel-Buchner .....................
                                                      B62D 1/06
                                                      340/459

(Continued)

FOREIGN PATENT DOCUMENTS

CN   104995054 A       10/2015
DE   102015003668 A1 *  9/2015   ......... B62D 15/0215

(Continued)

OTHER PUBLICATIONS

International Search Report (PCT/ISA/210) issued in PCT Application No. PCT/KR2020/006178 dated Aug. 7, 2020 with English Translation.

(Continued)

*Primary Examiner* — Justin S Lee
(74) *Attorney, Agent, or Firm* — Hauptman Ham, LLP

(57) ABSTRACT

The present invention relates to a steering control device and method, and a steering control system, and, more specifically, to a steering control device comprising: a rack position detection unit for detecting the rack position of an output device after the ignition of a vehicle is turned on; a steering wheel rotation angle determination unit for determining the rotation angle of a steering wheel corresponding to the rack position; a steering wheel display unit for displaying, on the steering wheel, the center position of the steering wheel according to the rotation angle of the steering wheel; and a steering reaction force provision unit for providing a steering reaction force according to the rotation angle of the steering wheel.

16 Claims, 14 Drawing Sheets

(51) Int. Cl.
  B62D 5/04 (2006.01)
  B62D 15/02 (2006.01)

(56) References Cited

U.S. PATENT DOCUMENTS

| | | | |
|---|---|---|---|
| 2008/0281490 A1* | 11/2008 | Wittig | B62D 5/0457 |
| | | | 701/41 |
| 2012/0179328 A1* | 7/2012 | Goldman-Shenhar | B62D 1/06 |
| | | | 701/36 |
| 2012/0330510 A1* | 12/2012 | Kawase | B62D 5/0469 |
| | | | 701/41 |
| 2014/0111325 A1* | 4/2014 | Lisseman | B62D 1/06 |
| | | | 340/435 |
| 2015/0232122 A1* | 8/2015 | Sakurai | B62D 6/008 |
| | | | 701/41 |
| 2016/0052549 A1* | 2/2016 | Eichhorn | B60W 50/14 |
| | | | 701/41 |
| 2016/0090123 A1* | 3/2016 | Zaman | B62D 15/02 |
| | | | 701/41 |
| 2017/0267285 A1 | 9/2017 | Abbas et al. | |
| 2018/0113454 A1* | 4/2018 | Emura | B60W 50/082 |
| 2019/0359252 A1* | 11/2019 | Yu | G06F 17/142 |
| 2020/0023830 A1 | 1/2020 | Breisinger et al. | |
| 2020/0039558 A1* | 2/2020 | Aerts | B62D 1/046 |
| 2020/0180680 A1* | 6/2020 | Han | B62D 5/0463 |
| 2020/0269912 A1* | 8/2020 | Lapis | B62D 6/006 |
| 2020/0277004 A1* | 9/2020 | Zheng | B62D 5/0463 |
| 2020/0339191 A1* | 10/2020 | Polmans | B62D 6/008 |
| 2020/0406964 A1* | 12/2020 | Hultén | B62D 6/008 |
| 2021/0179167 A1* | 6/2021 | Boos | B62D 6/10 |
| 2021/0309292 A1* | 10/2021 | Suzuki | B62D 6/008 |
| 2022/0227416 A1* | 7/2022 | Suzuki | B62D 15/025 |

FOREIGN PATENT DOCUMENTS

| | | | | | |
|---|---|---|---|---|---|
| JP | 8-207814 A | | 8/1996 | | |
| JP | 10-236329 A | | 9/1998 | | |
| JP | H10236329 A | * | 9/1998 | | B62D 5/04 |
| JP | 2002-284029 A | | 10/2002 | | |
| JP | 2006-44485 A | | 2/2006 | | |
| JP | 2006-62627 A | | 3/2006 | | |
| JP | 2007-153115 A | | 6/2007 | | |
| JP | 2008-49914 A | | 3/2008 | | |
| JP | 2008-230388 A | | 10/2008 | | |
| JP | 2009-90939 A | | 4/2009 | | |
| JP | 2016-78738 A | | 5/2016 | | |
| KR | 10-2006-0058220 A | | 5/2006 | | |
| KR | 10-2011-0088897 A | | 8/2011 | | |
| KR | 10-2012-0127947 A | | 11/2012 | | |

OTHER PUBLICATIONS

Written Opinion (PCT/ISA/237) issued in PCT Application No. PCT/KR2020/006178 dated Aug. 7, 2020.

Chinese Office Action issued on Dec. 15, 2023, in connection with the Chinese Patent Application No. 202080036550.2, 16 pages, with English machine translation.

Notice of Allowance issued on Apr. 30, 2024 for corresponding Chinese Patent Application No. 202080036550.2 along with an English translation (7 pages).

Yin Na, "The Research of Loaders Wire Steering System", China Academic Journal Electronic Publishing House, Master Degree Thesis of Qingdao University of Science & Technology, Apr. 15, 2015, with English Abstract, cited in NPL No. 1, 89 pages.

* cited by examiner

STEERING CONTROL DEVICE AND METHOD THEREFOR, AND STEERING CONTROL SYSTEM

This application is the U.S. National Phase under 35 U.S.C. § 371 of International Patent Application No. PCT/KR2020/006178, filed on May 11, 2020, which claims priority from Korean Patent Application No. 10-2019-0057367, filed on May 16, 2019, which is hereby incorporated by reference for all purposes as if fully set forth herein. In addition, if this patent application claims priority for countries other than the United States for the same reason as above, all the contents are incorporated into this patent application by reference.

TECHNICAL FILED

The present disclosure relates to a steering control device and method, and a steering control system, and, more specifically, to a steering control device and method, and a steering control system for synchronizing the positions of a steering wheel and the rack after the ignition of a vehicle is turned on, and displaying information on the position of the steering wheel according to the rack position on the steering wheel.

BACKGROUND ART

The steer-by-wire (SBW) system refers to a device which generates a signal by detecting the manipulation of the steering wheel by the driver instead of a mechanical structure connecting the steering wheel and the wheel, and controls the steering of the wheel using the corresponding signal.

In a conventional electric power steering device, a steering wheel, a column, an intermediate shaft (IMS) for a steering system, a rack, and a wheel are mechanically connected, so that the neutral of the wheel or rack and the neutral of the steering wheel are always fixed. That is, since the wheel or rack and the steering wheel are physically connected, they are always synchronized.

On the other hand, in the case of the SBW system, since an input mechanism including the steering wheel and column is not physically connected to an output mechanism including the wheel and the rack, and the SBW system is controlled based on the signal generated by the electronic control device. therefore, there may be a change in the position of the steering wheel or the rack position by an external force after the ignition of the vehicle is turned off. However, in the conventional SBW system, the driver of the vehicle does not recognize such a change in position, so that steering control according to the change in position cannot be properly performed.

DISCLOSURE

Technical Problem

In this background, the present disclosure proposes to a device and method, and a system for synchronizing the vehicle wheel or the rack with the steering wheel, after the ignition of a vehicle is turned on, and displaying the position of the steering wheel corresponding to the actual rack position on the steering wheel when the ignition is turned on.

Technical Solution

In one aspect of the present disclosure, the present disclosure provides a steering control device including a rack position detection unit for detecting a rack position of an output device after an ignition of a vehicle is turned on, a steering wheel rotation angle determination unit for determining a rotation angle of a steering wheel corresponding to the rack position, a steering wheel display unit for displaying, on the steering wheel, a center position of the steering wheel according to the rotation angle of the steering wheel, and a steering reaction force provision unit for providing a steering reaction force according to the rotation angle of the steering wheel.

In another aspect of the present disclosure, the present disclosure provides a steering control method including detecting a rack position of an output device after an ignition of a vehicle is turned on, determining a rotation angle of a steering wheel corresponding to the rack position, displaying, on the steering wheel, a center position of the steering wheel according to the rotation angle of the steering wheel, and providing a steering reaction force according to the rotation angle of the steering wheel.

In another aspect of the present disclosure, the present disclosure provides a steering control system including an output device for detecting a rack position after an ignition of a vehicle is turned on, an electronic control unit for determining a rotation angle of a steering wheel corresponding to the rack position, and an input device for displaying a center position of the steering wheel according to the rotation angle of the steering wheel on the steering wheel, and providing a steering reaction force according to the rotation angle of the steering wheel.

Advantageous Effects

According to the present disclosure, after the ignition of a vehicle is turned on, the vehicle wheels or rack is synchronized with the steering wheel, and when the ignition is turned on, the steering wheel position corresponding to the actual rack position is displayed on the steering wheel. Accordingly, a driver of the vehicle may accurately recognize the position of the steering wheel or the vehicle wheel, thereby performing stable steering control.

MODE FOR DISCLOSURE

Figure 1:
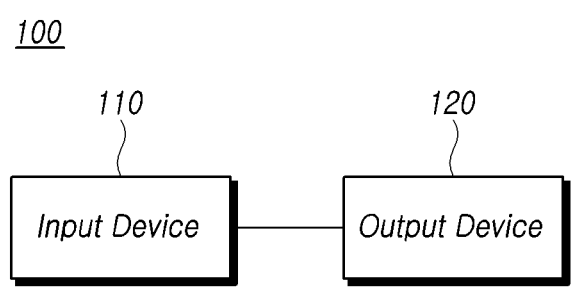
FIG. 1 is a diagram illustrating a configuration of a steering apparatus according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is described that an element is "connected", "coupled" or "linked" to the other element, the element may be directly connected or coupled to the other element, however, it should be understood that another element may be "connected", "coupled" or "linked" between the element and the other element.

A vehicle in the present specification may be a concept including an automobile, a motorcycle, and the like. In addition, the vehicle may be a concept including both an internal combustion engine vehicle having an engine as a power source, a hybrid vehicle having an engine and an electric motor as a power source, and an electric vehicle having an electric motor as a power source. Hereinafter, the vehicle will be mainly described with respect to the automobile.

FIG. 1 is a diagram illustrating a configuration of a steering apparatus according to an embodiment of the present disclosure. The steering device of the present disclosure may include a steer-by-wire (SBW) system. Hereinafter, the steering device of the present disclosure will be described based on the SBW system.

Referring to FIG. 1, a steering apparatus 100 of the present disclosure includes an input device 110 for receiving a steering control signal for the vehicle from the driver of the vehicle, and an output device 120 for controlling the wheels of the vehicle according to the steering control signal input from the input device 110. Specifically, the input device 110, that is, a steering column unit may include a steering wheel, a steering shaft, a steering angle sensor for detecting a steering angle of the steering wheel, a torque sensor for detecting a torque of the steering shaft for the steering wheel, a reaction force motor providing a reaction torque according to the rotation of the steering wheel, etc. The output device 120 may include a wheel, a rack, a steering output sensor capable of detecting the rotation angle of the wheel, a steering motor for generating assistance force to steer the wheel, a steering motor position sensor for detecting the position of the rotating shaft of the steering motor, a rack position sensor for detecting the position of a rack, and the like.

When the driver rotates the steering wheel, the amount of rotation of the steering wheel and a torque of a torsion bar detected by the steering angle sensor and the torque sensor are transmitted to an electronic control unit (ECU), and the electronic control unit generates a current for steering control of the wheel and provides to the steering motor to steer the wheel.

In addition, in the steer-by-wire system, when the driver manipulates the steering wheel, a force is generated in the opposite direction to the steering wheel using a reaction force motor to provide the driver with an appropriate steering feeling.

Figure 2:
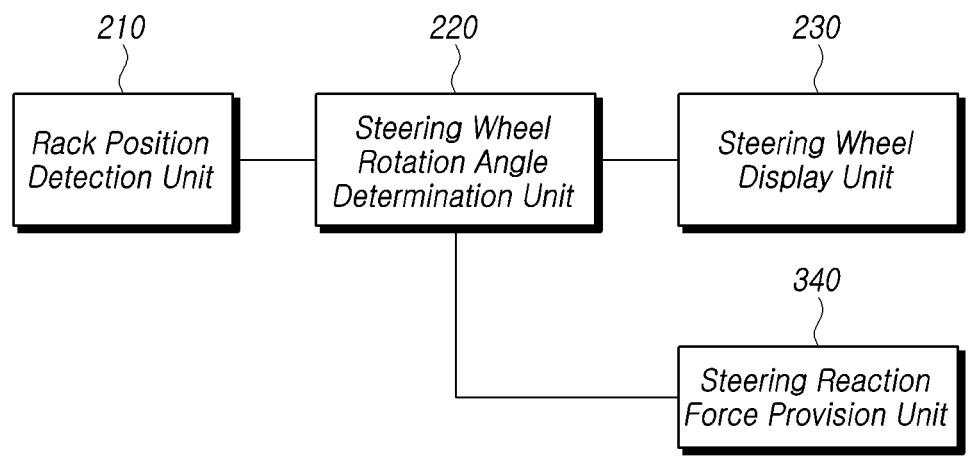
FIG. 2 is a diagram illustrating a configuration of a steering control device according to an embodiment of the present disclosure.

FIG. 2 is a diagram illustrating a configuration of a steering control device according to an embodiment of the present disclosure.

Referring to FIG. 2, the steering control device 200 of the present disclosure includes a rack position detection unit 210 for detecting a rack position of an output device after an ignition of the vehicle is turned on, a steering wheel rotation angle determination unit 220 for determining a rotation angle of the steering wheel corresponding to the rack position, a steering wheel display unit 230 for displaying a center position of the steering wheel according to the rotation angle of the steering wheel on the steering wheel, and a steering reaction force provision unit 240 for providing a steering reaction force according to the rotation angle of the steering wheel.

The rack position detection unit 210 of the present disclosure detects the rack position of the output device after an ignition of the vehicle is turned on. The rack position detection unit 210 may acquire rack position information using a rack position sensor for detecting the position of the rack in the output device. The steering wheel rotation angle determination unit 220 determines the rotation angle of the steering wheel corresponding to the rack position detected by the rack position detection unit 210.

Figure 3:
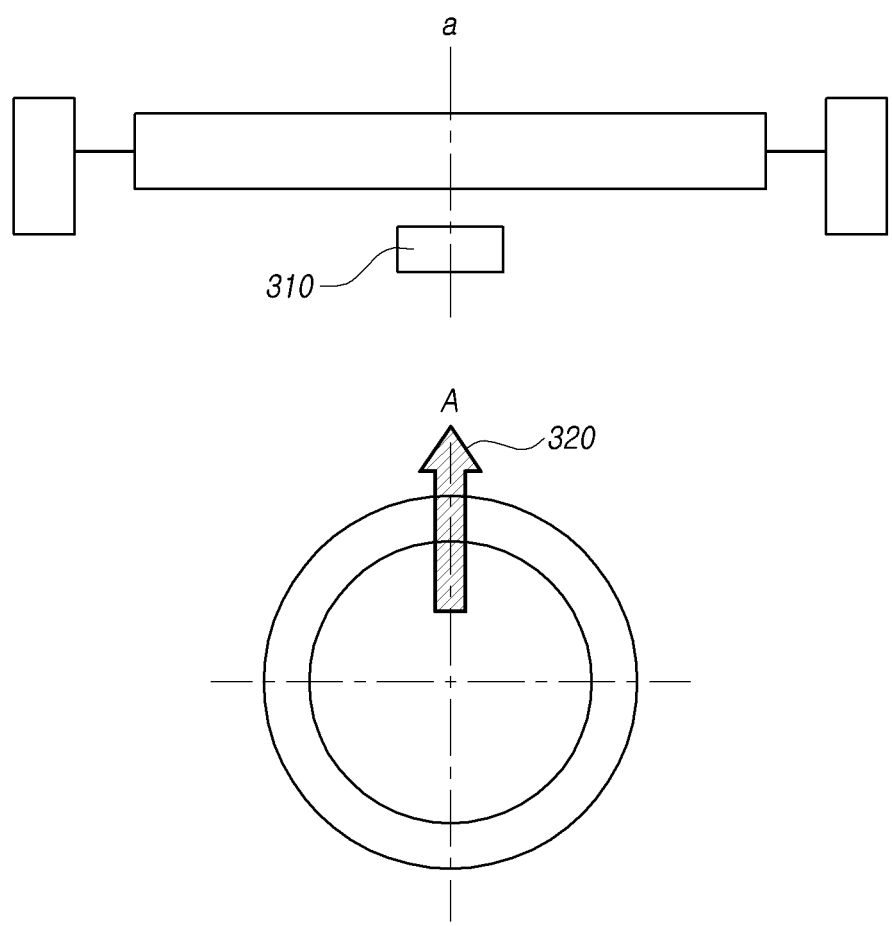
FIG. 3 is a diagram illustrating a case in which a rack position and a position of a steering wheel are synchronized in one embodiment of the present disclosure.

In general, the rack position of the output device and the position of the steering wheel of the input device are synchronized as shown in FIG. 3. FIG. is a diagram illustrating a case in which the rack position and the position of the steering wheel are synchronized in one embodiment of the present disclosure. If the vehicle is in a neutral state when the ignition of the vehicle is turned off, the rack and the steering wheel remain synchronized even after the vehicle's ignition is turned on, unless an external force is applied to the vehicle wheels or steering wheel. That is, as shown in FIG. 3, in the case that the rack position 310 is located at the center of the rack after the ignition of the vehicle is turned on, the center position 320 of the steering wheel is the position A indicating upward direction. Here, the center position of the steering wheel indicates a point located at the position A above the steering wheel when the steering wheel is in a neutral state.

Figure 4:
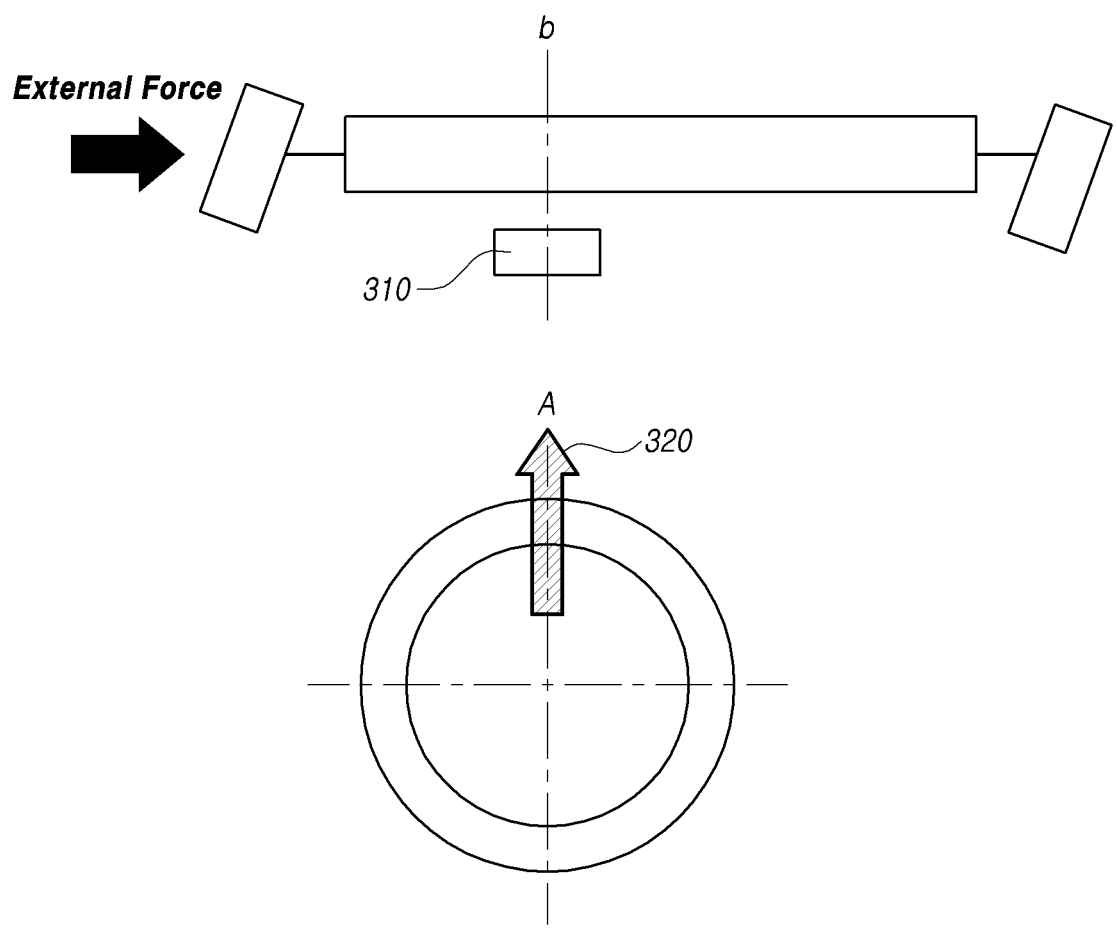
FIG. 4 is a diagram illustrating a case in which a rack position is changed by an external force in an embodiment of the present disclosure.

However, if an external force is applied to the wheels of the vehicle in a state in which the vehicle's ignition is turned off, the rack position of the output device and the position of the steering wheel of the input device are not synchronized as shown in FIG. 4. FIG. 4 is a diagram illustrating a case in which the rack position is changed by an external force in an embodiment of the present disclosure. Specifically, if an external force is applied to the wheels in a state in which the ignition of the vehicle is turned off, the center position of the steering wheel is the position A indicating upward similarly to when the ignition is turned off, however, the rack position is changed by the direction of the external force applied to the wheel.

Figure 5:
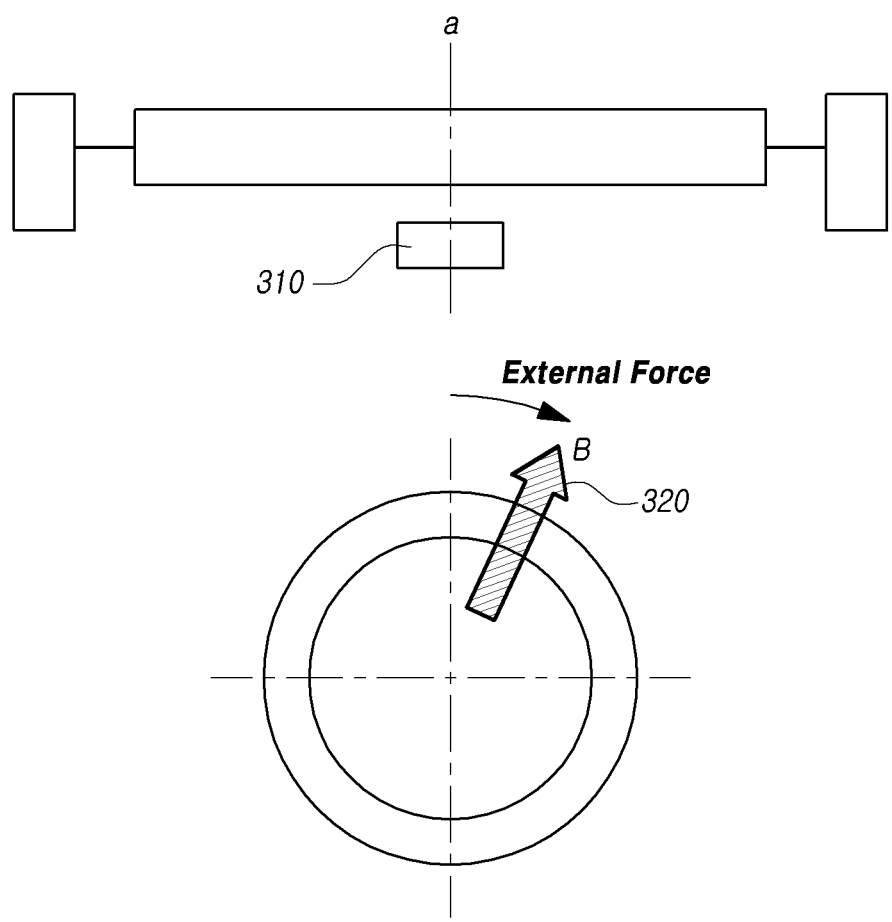
FIG. 5 is a diagram illustrating a case in which the steering wheel is rotated by an external force in an embodiment of the present disclosure.

Similarly, if an external force is applied to the steering wheel of the vehicle in a state in which the vehicle's ignition is turned off, the rack position of the output device and the position of the steering wheel of the input device are not synchronized as shown in FIG. 5. FIG. 5 is a diagram illustrating a case in which the steering wheel is rotated by an external force in an embodiment of the present disclosure. Specifically, if an external force is applied to the steering wheel in a state in which the ignition of the vehicle is turned off, the rack position is at the position 'a', which is the center of the rack, similarly to when the ignition is turned off, however, the position of the steering wheel is changed by the direction of the external force applied to the wheel.

Accordingly, the rack position detection unit 210 of the present disclosure detects the rack position of the output device after the ignition of the vehicle is turned on, and the steering wheel rotation angle determination unit 220 determines a rotation angle of the steering wheel corresponding to the rack position for synchronization with the rack position detected by the rack position detection unit 210.

In an embodiment, the steering wheel rotation angle determination unit 220 may determine the rotation angle of the steering wheel based on the rack position, an one-side rack threshold, and an one-side steering wheel threshold. Here, the one-side rack threshold means the maximum value at which the position of the rack can move in a specific direction from the center position of the rack. The one-side steering wheel threshold value means the maximum value at which the center position of the steering wheel can move in a specific direction from the center position of the range in which the steering wheel can rotate. That is, the one-side rack threshold and the one-side steering wheel threshold indicate a range that can be moved in a specific direction from the neutral position, and may be determined by design in the SBW system. The neutral position indicates a position in which the rack or steering wheel is not biased in any direction.

The steering wheel rotation angle determination unit 220 may determine the rotation angle of the steering wheel corresponding to the detected rack position by using the detected rack position, the one-side rack threshold, and the one-side steering wheel threshold. Specifically, the steering wheel rotation angle determination unit 220 may determine the rotation angle of the steering wheel, that is, the position of the steering wheel, by using the following equation.

$$\frac{\text{Rack position}}{\text{One-side rack threshold}} = \frac{\text{Rotation angle of steering wheel}}{\text{One-side steering wheel threshold}}$$

The steering wheel display unit 230 of the present disclosure displays the center position of the steering wheel according to the rotation angle of the steering wheel on the steering wheel. That is, the steering wheel display unit 230 may display the center position of the steering wheel on the steering wheel in consideration of the position of the steering wheel corresponding to the detected rack position.

Figure 6:
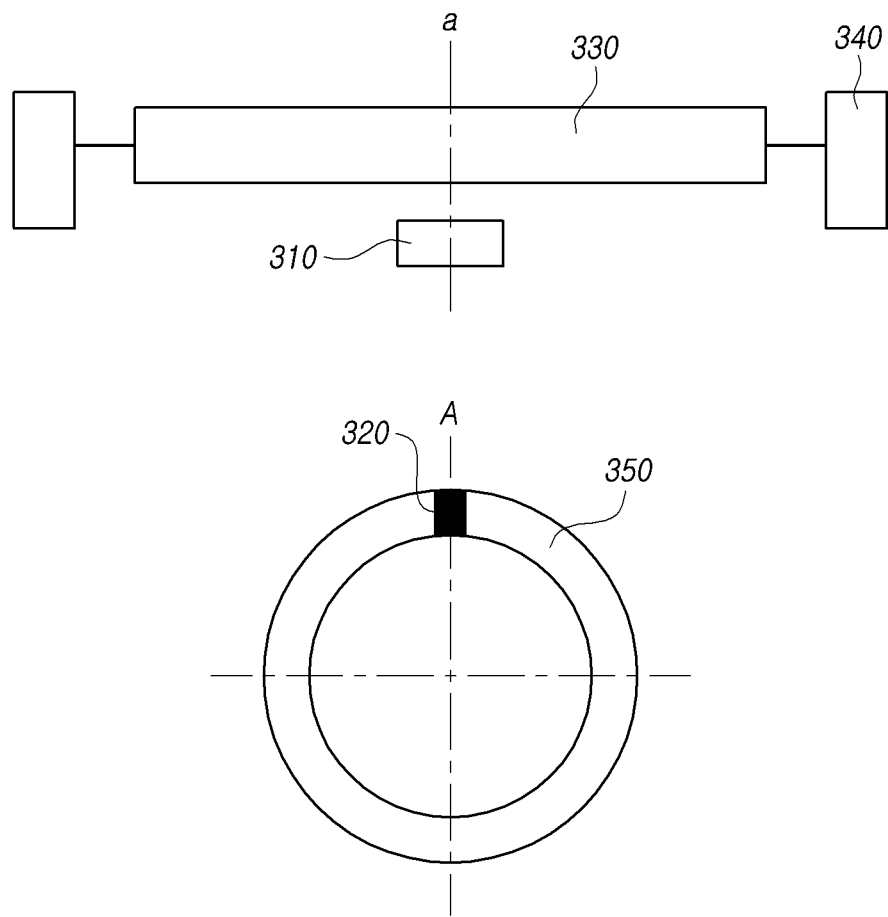
FIG. 6 is a diagram illustrating a method in which the steering control device according to an embodiment of the present disclosure synchronizes a rack position and a position of a steering wheel.

FIG. 6 is a diagram illustrating a method in which the steering control device according to an embodiment of the present disclosure synchronizes a rack position and a position of a steering wheel. Referring to FIG. 6, the wheels 340 are aligned toward the front of the vehicle, and accordingly, the rack position 330 detected by the rack position sensor 310 is also the center of the rack 330. Since the steering wheel 350 is not rotated and is synchronized with the rack position, an indicator 320 indicating the center position of the steering wheel is displayed at the position A above the steering wheel. Here, the indicator 320 may be a light emitting device for indicating the center position of the steering wheel. A light emitting device is mounted along the steering wheel 350, and a specific position of the light emitting device may emit light at a position corresponding to the center position of the steering wheel. The light emitting device may be mounted to the steering wheel continuously or discontinuously along the steering wheel.

In an embodiment, the center position of the steering wheel according to the rotation angle of the steering wheel may be displayed by blinking on the steering wheel after the ignition of the vehicle is turned on. In another embodiment, the center position of the steering wheel according to the rotation angle of the steering wheel may be displayed for a predetermined time interval after the ignition of the vehicle is turned on.

In an embodiment, the steering wheel display unit 230 may display the center position of the steering wheel on the steering wheel in one of a plurality of different colors according to the rotation angle of the steering wheel.

In an embodiment, the steering wheel display unit 230 may determine a rotation angle range to which the rotation angle of the steering wheel belongs among N rotation angle ranges, and may display the center position of the steering wheel on the steering wheel in a color of the rotation angle range to which the rotation angle of the steering wheel belongs. For example, in the case that the rotation angle range of the steering wheel is classified in units of one rotation of the steering wheel, if the rotation angle of the steering wheel does not exceed one rotation of the steering wheel in the right direction, the steering wheel display unit 230 may display the center position of the steering wheel in blue color. As another example, if the rotation angle of the steering wheel is one rotation or more of the steering wheel in the right direction, the steering wheel display unit 230 may display the center position of the steering wheel in yellow color.

Figure 7:
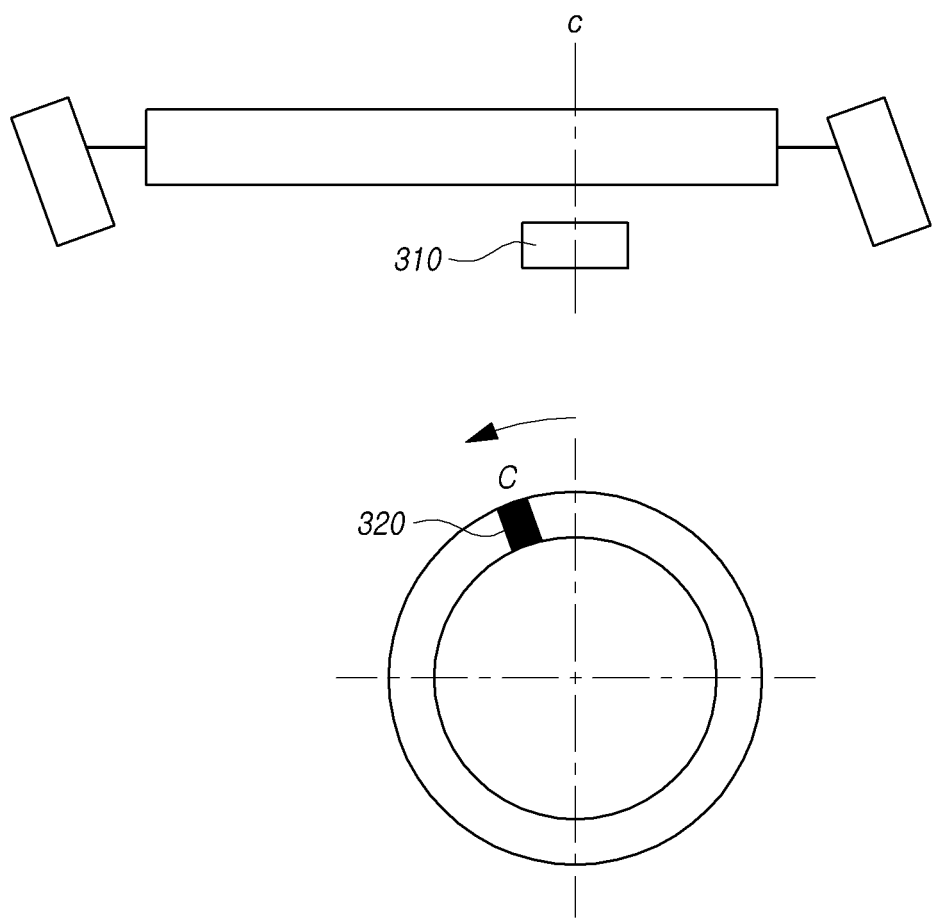
FIGS. 7 and 8 are diagrams illustrating colors displayed when a rotation angle of the steering wheel corresponding to the rack position does not exceed one rotation of the steering wheel in an embodiment of the present disclosure.
Figure 8:
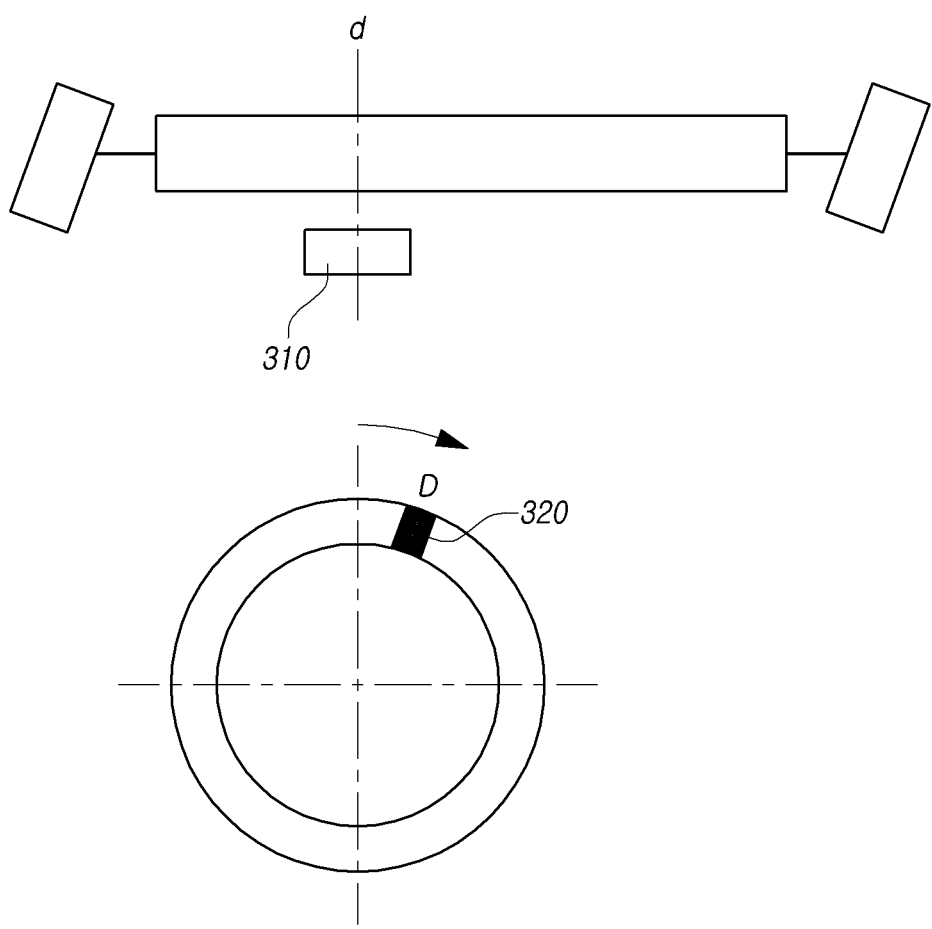

FIGS. 7 and 8 are diagrams illustrating colors displayed when a rotation angle of the steering wheel corresponding to the rack position does not exceed one rotation of the steering wheel in an embodiment of the present disclosure.

Referring to FIG. 7, in the case that the direction of the wheel is deflected toward the left side of the vehicle, that is, when the rack position 310 of the output device is moved from the center of the rack to the right position c, the direction of the rotation angle of the steering wheel corresponding to the rack position indicates the left side in the vertical direction of the steering wheel, and the rotation angle of the steering wheel is determined according to the degree to which the rack position is moved from the center of the rack. In FIG. 7, the center position 320 of the steering wheel according to the rotation angle of the steering wheel is the position C, and an indicator indicating the center position of the steering wheel is displayed at the position C. In addition, since the rotation angle of the steering wheel corresponding to the rack position does not exceed one rotation of the steering wheel, the steering wheel display unit 230 may display the center position of the steering wheel at position C in a color indicating a rotation angle range to which the rotation angle of the steering wheel belongs, for example, in green color.

Referring to FIG. 8, in the case that the direction of the wheel is deflected toward the right side of the vehicle, that is, when the rack position 310 of the output device is moved to the position d which is left side from the center of the rack, the direction of the rotation angle of the steering wheel corresponding to the rack position indicates the right side in the vertical direction of the steering wheel, and the rotation angle of the steering wheel is determined according to the degree to which the position of the rack is moved from the center of the rack. In FIG. 8, the center position 320 of the steering wheel according to the rotation angle of the steering wheel is the position D, and an indicator indicating the center position of the steering wheel is displayed at the position D. In addition, since the rotation angle of the steering wheel corresponding to the rack position does not exceed one rotation of the steering wheel, the steering wheel display unit 230 may display the center position of the steering wheel at position D in a color indicating a rotation angle range to which the rotation angle of the steering wheel belongs, for example, in blue color.

Figure 9:
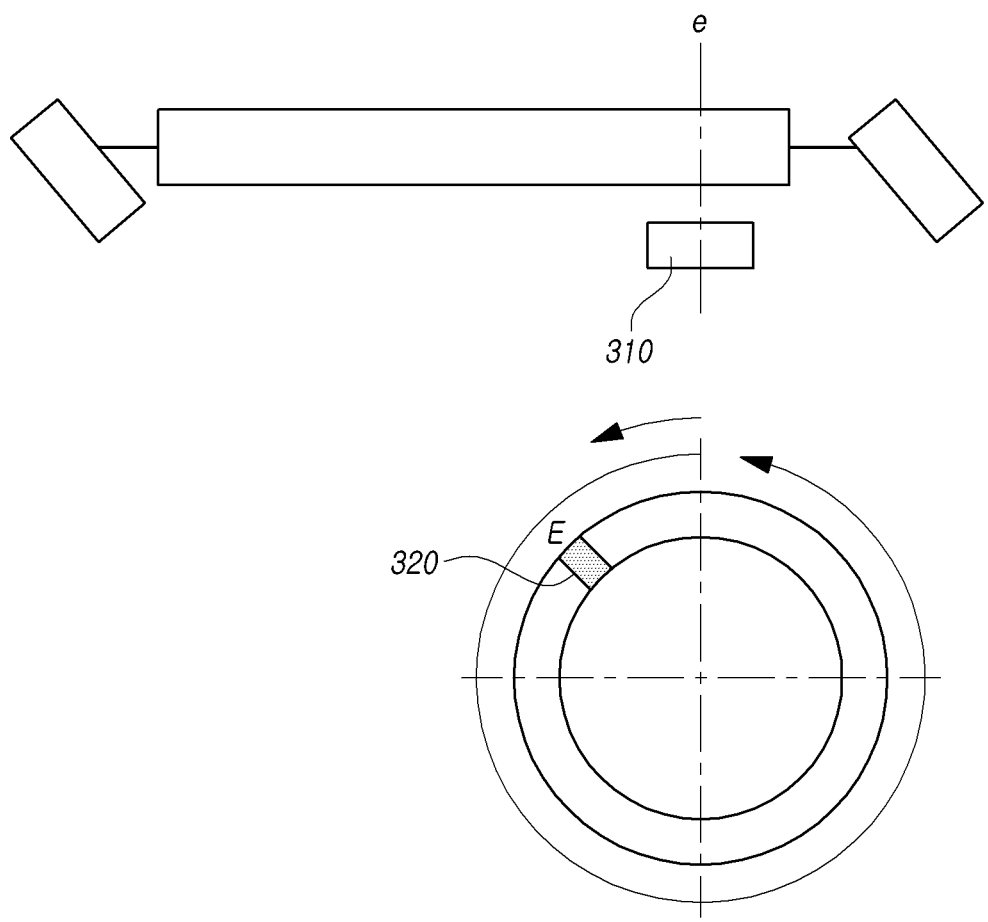
FIGS. 9 and 10 are diagrams illustrating colors displayed when a rotation angle of the steering wheel corresponding to the rack position is one rotation or more of the steering wheel in an embodiment of the present disclosure.
Figure 10:
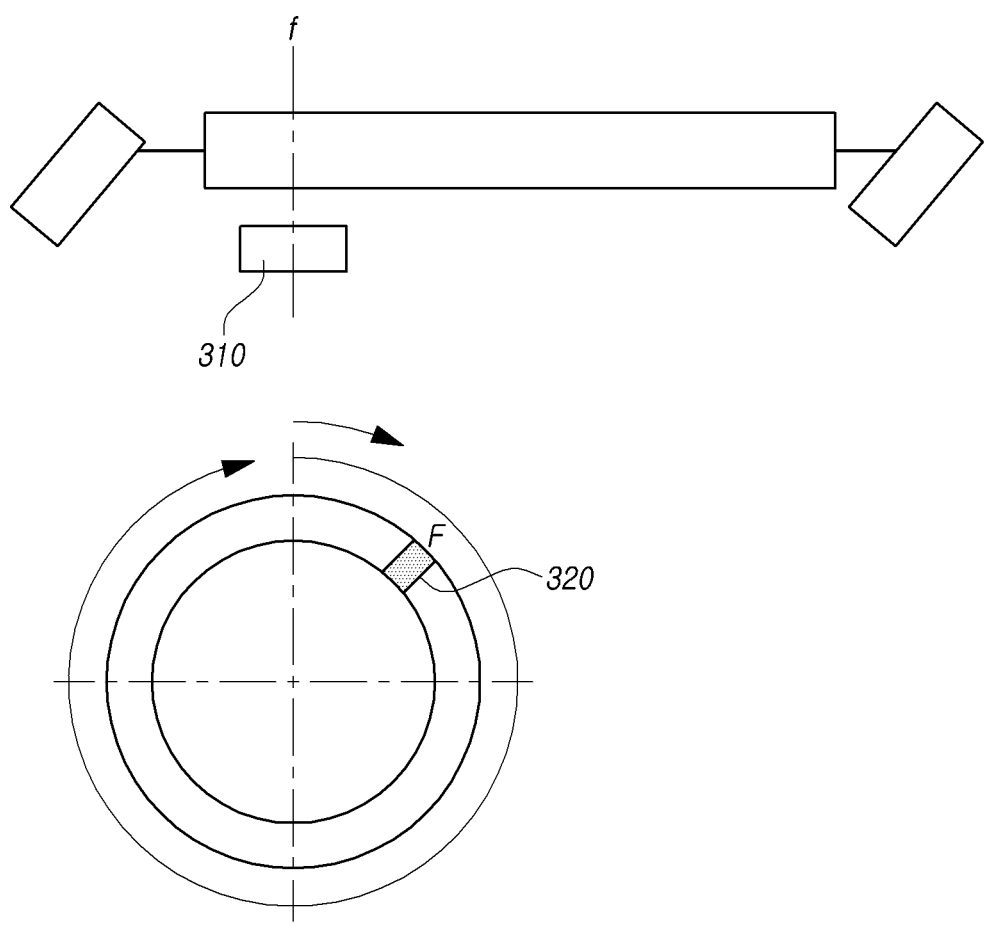

FIGS. 9 and 10 are diagrams illustrating colors displayed when a rotation angle of the steering wheel corresponding to the rack position is one rotation or more of the steering wheel in an embodiment of the present disclosure.

Referring to FIG. 9, in the case that the direction of the wheel is greatly deflected toward the left side of the vehicle, that is, in the case that the rack position 310 of the output device is moved from the center of the rack to the position e which is the right side, the direction of the rotation angle of the steering wheel corresponding to the rack position indicates the left side in the vertical direction of the steering wheel, and the rotation angle of the steering wheel is determined according to the degree to which the rack position is moved from the center of the rack. In FIG. 9, the center position 320 of the steering wheel according to the rotation angle of the steering wheel is position E, but since the rotation angle of the steering wheel corresponding to the rack position is one rotation or more of the steering wheel, the steering wheel display unit 230 may display, in order to distinguish the rotation angle of the steering wheel in the state shown in FIG. 9 and the rotation angle of the steering wheel in FIG. 7, the center position of the steering wheel of FIG. 9 in a color different from the color indicating the center position of the steering wheel in FIG. 7. For example, the steering wheel display unit 230 may display the center position of the steering wheel at position E in pink color.

Referring to FIG. 10, in the case that the direction of the wheel is greatly deflected toward the right side of the vehicle, that is, in the case that the rack position 310 of the output device is moved from the center of the rack to the position f which is the left side, the direction of the rotation angle of the steering wheel corresponding to the rack position indicates the right side in the vertical direction of the steering wheel, and the rotation angle of the steering wheel is determined according to the degree to which the rack position is moved from the center of the rack. In FIG. 10, the center position 320 of the steering wheel according to the rotation angle of the steering wheel is position F, but since the rotation angle of the steering wheel corresponding to the rack position is one rotation or more of the steering wheel, the steering wheel display unit 230 may display, in order to distinguish the rotation angle of the steering wheel in the state shown in FIG. 10 and the rotation angle of the steering wheel in FIG. 8, the center position of the steering wheel of FIG. 10 in a color different from the color indicating the center position of the steering wheel in FIG. 8. For example, the steering wheel display unit 230 may display the center position of the steering wheel at position F in pink color.

In an embodiment, the steering wheel display unit 230 may move the display position from the center position of the steering wheel to the neutral position so that the center position of the steering wheel according to the rotation angle of the steering wheel can return to the neutral position. If the steering direction of the vehicle is not in the neutral position after the ignition of the vehicle is turned on, the driver may feel a sense of difference in the steering and the driving stability of the vehicle may be reduced. Therefore, it is required to return the position of the steering wheel corresponding to the rack position to the neutral position. Accordingly, the steering wheel display unit 230 may display the center position of the steering wheel according to the rack position when the vehicle's ignition is turned-on on the steering wheel, and if the center position of the steering wheel is not located in the neutral position, in order for the driver of the vehicle to return the steering state of the vehicle to the neutral state, the steering wheel display unit may move the light emitting part displayed on the steering wheel from the center position of the steering wheel to the neutral position.

In an embodiment, the steering control device of the present disclosure may further include a signal output unit (not shown) for outputting, when the center position of the steering wheel according to the rotation angle of the steering wheel does not correspond to the neutral position, a signal indicating that the center position of the steering wheel does not correspond to the neutral position. Here, the signal output unit may include a vibration notification of the steering wheel, a sound notification, and a lighting notification displayed on a dashboard of the vehicle, except for displaying the center position of the steering wheel on the steering wheel.

In an embodiment, the steering control device of the present disclosure may further include a steering wheel rotation control unit (not shown) for rotating the steering wheel so that the center position of the steering wheel moves to a neutral position, if the center position of the steering wheel according to the rotation angle of the steering wheel does not correspond to the neutral position. The steering wheel rotation control unit may control to automatically rotate the steering wheel without manual rotation of the steering wheel by the driver of the vehicle so that the vehicle's steering direction becomes neutral state.

In another embodiment, the steering wheel rotation control unit, when the position of the steering wheel corresponding to the rack position does not coincide with the physical center position of the steering wheel, may stop the feedback to the output device for the rotation of the steering wheel, and may rotate the steering wheel so that the physical center position of the steering wheel coincides with the position of the steering wheel corresponding to the rack position. Here, the physical center position of the steering wheel refers to a position in a state in which the rack position and the position of the steering wheel are synchronized in designing the vehicle.

The steering reaction force provision unit 240 of the present disclosure provides a steering reaction force according to the rotation angle of the steering wheel. That is, the steering reaction force provision unit 240 may provide the steering reaction force by determining a motor current according to the center position of the steering wheel and providing the corresponding motor current to a reaction force motor.

Figure 11:
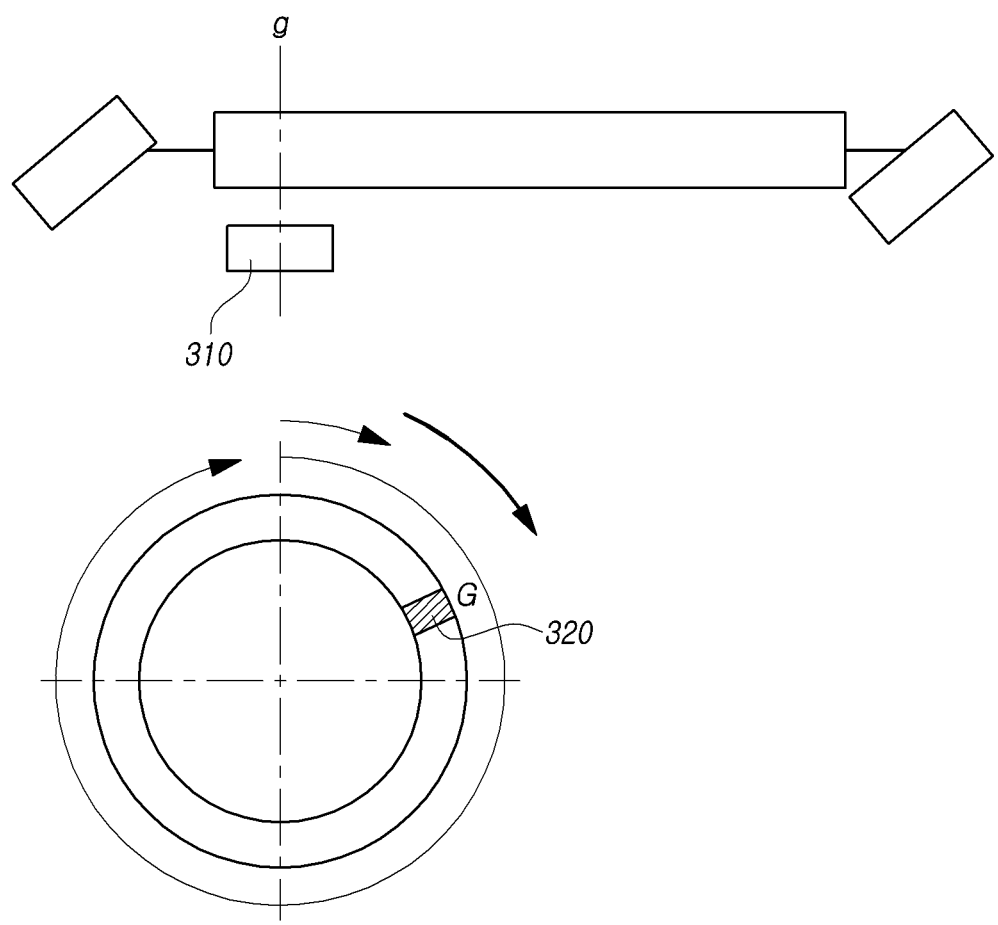
FIG. 11 is a diagram for explaining the display of a center position of the steering wheel on the steering wheel when the rack is positioned at the one-side rack threshold and the steering wheel is rotated in the direction that the rack position exceeds the one-side rack threshold.

FIG. 11 is a diagram for explaining the display of a center position of the steering wheel on the steering wheel when the rack is positioned at the one-side rack threshold and the steering wheel is rotated in the direction that the rack position exceeds the one-side rack threshold.

Referring to FIG. 11, in the case that the rack position 310 is located at g which is the one-side rack threshold, and the steering wheel is rotated in a direction in which the rack position exceeds the one-side rack threshold, the steering wheel display unit 230 may display in a color different from a plurality of different colors on the steering wheel.

Specifically, FIG. 11 is a case in which the direction of the wheel is greatly deflected toward the right side of the vehicle, and in this case, the rack position 310 may reach the one-side rack threshold g. Accordingly, the center position of the steering wheel may be displayed in the position G corresponding to the one-side rack threshold. Here, if the steering wheel is rotated in a direction exceeding the one-side rack threshold by an external force such as a driver's manipulation, the steering wheel display unit 230 may display at the position G in a color different from the plurality of different colors on the steering wheel. In addition, the G indicating the center position of the wheel does not move in response to the rotation of the steering wheel, but may be maintained at a position corresponding to the one-side rack threshold.

Although the rack position 310 reaches the one-side rack threshold, if the steering wheel is rotated in a direction exceeding the one-side rack threshold by an external force, the rack position 310 has already reached the one-side rack threshold and cannot move any further. In addition, in FIG. 12 to be described later, since the motor current increases as the steering wheel moves away from neutral, there may occur the power loss or there may generate a damage to the rack or the motor due to continuous motor current application.

Therefore, in order to prevent power loss and damage to the rack or motor, when the rack position 310 is located at the one-side rack threshold and the steering wheel is rotated in a direction exceeding the one-side rack threshold, the steering control device 200 blocks the application of motor current corresponding to the rotation of the steering wheel, and the steering wheel display unit 230 may display at the position G shown in FIG. 1 in a colors different from the plurality of different colors on the steering wheel. For example, the steering wheel display unit 230 may display the center position of the steering wheel at position G in red color. In addition, the steering wheel display unit 230 may control the color as well as a thickness or size in displaying the center position of the steering wheel, and may display to blink. For example, if the steering wheel is rotated in a direction exceeding the one-side rack threshold, the steering wheel display unit 230 may display a larger size than when adjusting the position of the rack, or may display to blink every predetermined time. In addition, for the above reasons, the rotation angle of the steering wheel may be determined to be less than or equal to the rotation angle of the steering wheel corresponding to the one-side rack threshold.

Figure 12:
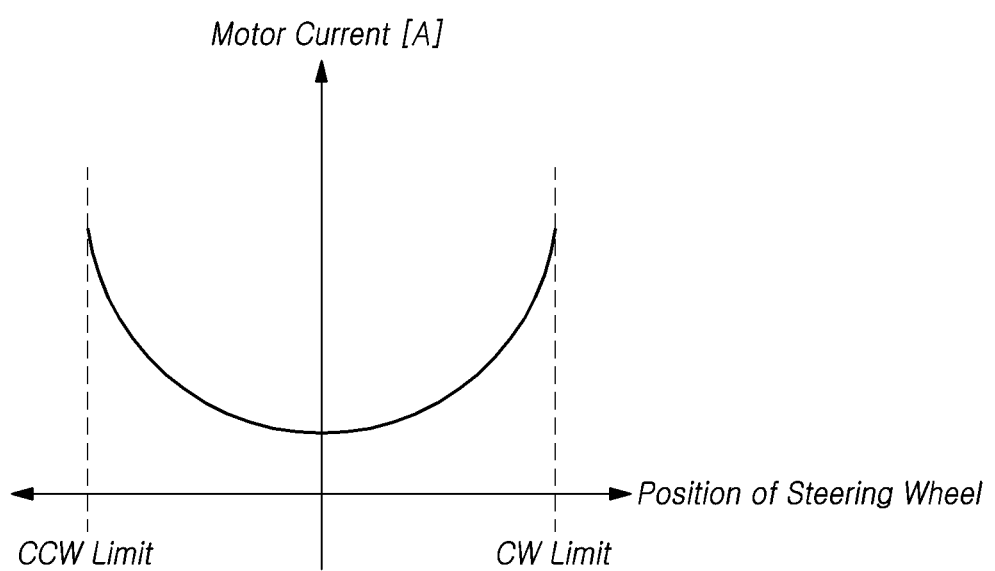
FIG. 12 is a graph illustrating a relationship between a position of a steering wheel and a steering motor current according to an embodiment of the present disclosure.

FIG. 12 is a graph illustrating a relationship between a position of a steering wheel and a steering motor current according to an embodiment of the present disclosure. Referring to FIG. 12, if the steering wheel position is in the neutral position, the motor current value is the smallest. Further, as the position of the steering wheel rotates in the left or right direction, the motor current value increases. That is, the steering reaction force determined according to the motor current value is determined according to the position of the steering wheel, and as the position of the steering wheel is deflected in a specific direction, the steering reaction force increases.

The steering reaction force provision unit 240 of the present disclosure may determine the motor current value based on the position of the steering wheel determined according to the rack position detected after the ignition of the vehicle is turned on, and may provide the steering reaction force by controlling the steering motor using the corresponding motor current value.

The steering control device of the present disclosure, after the ignition of the vehicle is turned on, may detect the rack position of the output device, determine the rotation angle of the steering wheel corresponding to the rack position, display the center position of the steering wheel according to the rotation angle of the steering wheel on the steering wheel, and provide the steering reaction force according to the rotation angle of the steering wheel. Accordingly, even if the rack position or the position of the steering wheel is changed by an external force in a state in which the ignition of the vehicle is turned off, it is possible to synchronize the positions of the rack and the steering wheel. Furthermore, since information on the center position of the steering wheel changed according to the rack position is displayed on the steering wheel, a driver of a vehicle including the steering control device of the present disclosure can efficiently perform steering control.

In one embodiment, in the case that the rack position is located at the one-side rack threshold, and the steering wheel is rotated in a direction exceeding the one-side rack threshold by an external force, the steering reaction force provision unit 240 may provide the steering reaction force equal to the rotation angle of the steering wheel.

Specifically, in the case that the wheel is largely deflected to the left or right by an external force so that the rack position is located at the one-side rack threshold, and the steering wheel rotates in a direction in which the rack position exceeds the one-side rack threshold by the external force, the steering control device 200 may block the application of the motor current corresponding to the rotation of the steering wheel exceeding the one-side rack threshold. For this reason, the steering reaction force provision unit 240 may provide the steering reaction force corresponding to the one-side rack threshold for the steering wheel rotating in a direction exceeding the one-side rack threshold, rather than a steering reaction force greater than the steering reaction force corresponding to the one-side rack threshold. In addition, the steering reaction force provision unit 240 may include a vibration module (not shown) capable of vibrating the steering wheel, and when the steering wheel is rotated in a direction exceeding the one-side rack threshold, may vibrate the steering wheel while providing a steering reaction force corresponding to the one-side rack threshold.

As described above, the steering control device 200 does not provide excessive steering reaction force when the position of the rack is located at the one-side rack threshold and the steering wheel is rotated so that the rack exceeds the one-side threshold, so that it is possible to avoid the power consumption, and it is possible to notify that the control limit of the steering wheel has been reached by vibrating the steering wheel.

Figure 13:
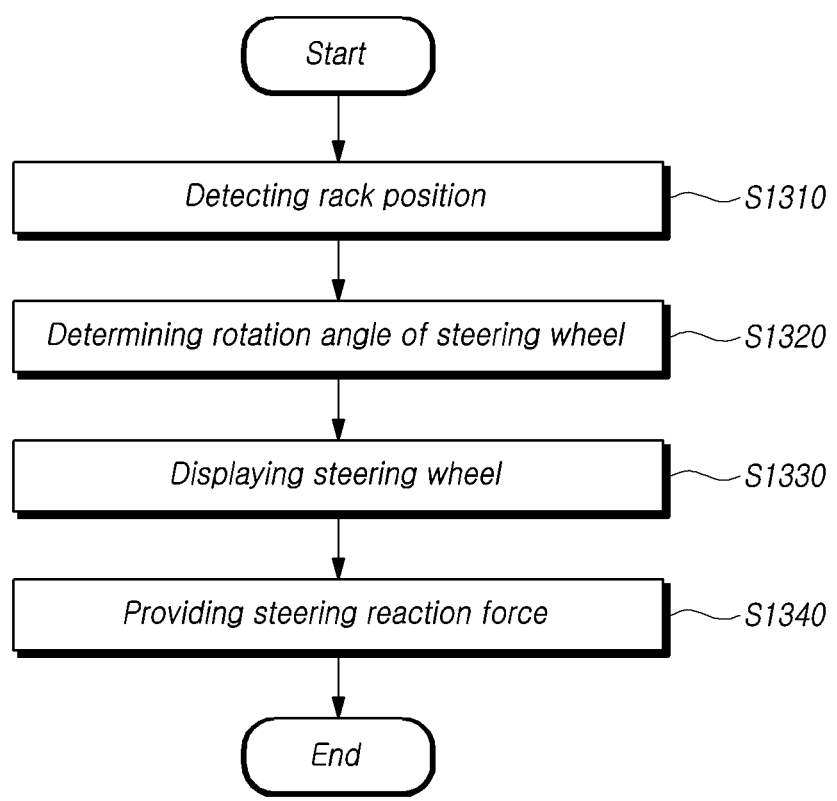
FIG. 13 is a flowchart illustrating a steering control method according to an embodiment of the present disclosure.

FIG. 13 is a flowchart illustrating a steering control method according to an embodiment of the present disclosure.

Referring to FIG. 13, the steering control method of the present disclosure may include a rack position detection step of detecting the rack position of the output device after the ignition of the vehicle is turned on (S1310), a steering wheel rotation angle determination step of determining a rotation angle of the steering wheel corresponding to the rack position (S1320), a steering wheel display step of displaying the center position of the steering wheel according to the rotation angle of the steering wheel on the steering wheel (S1330), and a steering reaction force providing step of providing a steering reaction force according to the rotation angle of the steering wheel (S1340).

In the rack position detection step (S1310) of the present disclosure, the steering control device detects the rack position of the output device after the ignition of the vehicle is turned on. Specifically, the steering control device may obtain the rack position information by using a rack position sensor that detects the position of the rack of the output device. The steering control device determines a rotation angle of the steering wheel corresponding to the detected rack position.

In the steering wheel rotation angle determination step (S1320) of the present disclosure, the steering control device determines the rotation angle of the steering wheel corresponding to the rack position. In an embodiment, the steering control device may determine the rotation angle of the steering wheel based on the rack position, the one-side rack threshold, and the one-side steering wheel threshold. Here, the one-sided rack threshold means the maximum value at which the rack position can move in a specific direction from the center position of the rack. The one-side steering wheel threshold value means the maximum value at which the center position of the steering wheel can move in a specific direction from the center position of the range in which the steering wheel can rotate. That is, the one-side rack threshold and the one-side steering wheel threshold indicate a range that can be moved in a certain direction from the neutral position, and may be determined by design in the SBW system. The neutral position indicates a position in which the rack or steering wheel is not biased in any direction.

The steering control device may determine the rotation angle of the steering wheel corresponding to the detected rack position by using the detected rack position, the one-side rack threshold, and the one-side steering wheel threshold. Specifically, the steering wheel rotation angle determination unit 220 may determine the rotation angle of the steering wheel, that is, the position of the steering wheel, by using the following equation.

$$\frac{\text{Rack position}}{\text{One-side rack threshold}} = \frac{\text{Rotation angle of steering wheel}}{\text{One-side steering wheel threshold}}$$

In the steering wheel display step (S1330) of the present disclosure, the steering control device may display the center position of the steering wheel according to the rotation angle of the steering wheel on the steering wheel. That is, the steering control device may display the center position of the steering wheel on the steering wheel in consideration of the position of the steering wheel corresponding to the detected rack position.

The center position of the steering wheel may be displayed on the steering wheel by an indicator. Here, the indicator may be a light emitting unit for indicating the center position of the steering wheel. A light emitting device is mounted along the steering wheel, and a specific position of the light emitting device may emit light at a position corresponding to the center position of the steering wheel. The light emitting device may be mounted to the steering wheel continuously or discontinuously along the steering wheel.

For example, in the case that the direction of the wheel is deflected toward the left side of the vehicle, that is, if the rack position of the output device is moved from the center of the rack to the right position, the direction of the rotation angle of the steering wheel corresponding to the position of the rack indicates the left side in the vertical direction of the steering wheel, and the rotation angle of the steering wheel has an angle rotated from the vertical axis to the left according to the degree to which the position of the rack is moved from the center of the rack. The rotation angle of the steering wheel is determined according to the rack position, and the center position of the steering wheel to be displayed on the steering wheel is determined according to the rotation angle of the steering wheel. In addition, the determined center position of the steering wheel is displayed on the steering wheel by, for example, a light emitting unit.

In an embodiment, the center position of the steering wheel according to the rotation angle of the steering wheel may be displayed by blinking on the steering wheel after the ignition of the vehicle is turned on. In another embodiment, the center position of the steering wheel according to the rotation angle of the steering wheel may be displayed for a predetermined time interval after the ignition of the vehicle is turned on.

Figure 14:
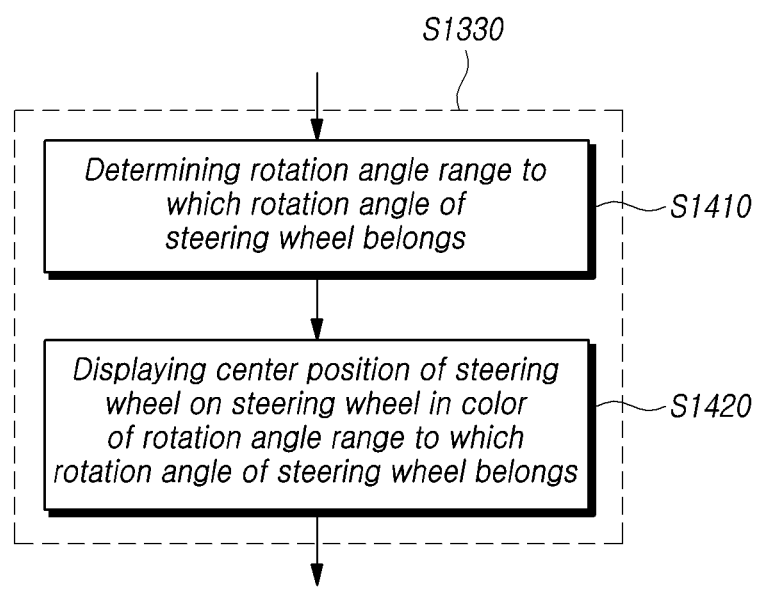
FIG. 14 is a flowchart illustrating a steering control method according to another embodiment of the present disclosure.

FIG. 14 is a flowchart illustrating the steering wheel display step (S1330) of the steering control method according to another embodiment of the present disclosure.

In the steering control method according to the embodiment of FIG. 14 of the present disclosure, the steering control device may determine a rotation angle range to which the steering wheel rotation angle belongs among the N rotation angle ranges (S1410), and may display the center position of the steering wheel on the steering wheel with a color of the rotation angle range to which the rotation angle of the steering wheel belongs (S1420). For example, in the case that the rotation angle range of the steering wheel is classified in units of one rotation of the steering wheel, if the rotation angle of the steering wheel does not exceed one rotation of the steering wheel in the right direction, the steering control device may display the center position of the steering wheel in blue color. As another example, if the rotation angle of the steering wheel is one rotation or more of the steering wheel in the right direction, the steering control device may display the center position of the steering wheel in yellow color.

In one embodiment, when the rack position is located at the one-side rack threshold and the steering wheel is rotated in a direction in which the rack position exceeds the one-side rack threshold, the steering control device may display in a color different from a plurality of different colors on the steering wheel.

In the case that the rack position is located at the one-side rack threshold, the center position of the steering wheel may be displayed at a position corresponding to the one-side rack threshold. Here, if the steering wheel rotates in a direction exceeding the one-side rack threshold by an external force such as a driver's manipulation, the steering control device 200 may display at the center position of the steering wheel in a color different from a plurality of different colors on the steering wheel.

Although the rack position reaches the one-side rack threshold, if the steering wheel is rotated in a direction exceeding the one-side rack threshold by an external force, the rack position has already reached the one-side rack threshold and cannot move any further. In addition, since the motor current increases as the steering wheel moves away from neutral, there may occur the power loss or there may generate a damage to the rack or the motor due to continuous motor current application.

Therefore, in order to prevent power loss and damage to the rack or motor, when the rack position is located at the one-side rack threshold and the steering wheel is rotated in a direction exceeding the one-side rack threshold, the steering control device 200 blocks the application of motor current corresponding to the rotation of the steering wheel, and may display at the center position of the steering wheel in a colors different from the plurality of different colors on the steering wheel. For example, the steering control device 200 may display the center position of the steering wheel in red color. In addition, for the above reasons, the rotation angle of the steering wheel may be determined to be less than or equal to the rotation angle of the steering wheel corresponding to the one-side rack threshold.

In an embodiment, the steering control device may move the display position from the center position of the steering wheel to the neutral position so that the center position of the steering wheel according to the rotation angle of the steering wheel can return to the neutral position. If the steering direction of the vehicle is not in the neutral position after the ignition of the vehicle is turned on, the driver may feel a sense of difference in the steering and the driving stability of the vehicle may be reduced. Therefore, it is required to return the position of the steering wheel corresponding to the rack position to the neutral position. Accordingly, the steering control device may display the center position of the steering wheel according to the rack position when the vehicle's ignition is turned-on on the steering wheel, and if the center position of the steering wheel is not located in the neutral position, in order for the driver of the vehicle to return the steering state of the vehicle to the neutral state, the steering control device may move the light emitting part displayed on the steering wheel from the center position of the steering wheel to the neutral position.

In an embodiment, the steering control method of the present disclosure may further include a signal outputting step (not shown) for outputting, when the center position of the steering wheel according to the rotation angle of the steering wheel does not correspond to the neutral position, a signal indicating that the center position of the steering wheel does not correspond to the neutral position. Here, in the signal outputting step, the steering control device may include a vibration notification of the steering wheel, a sound notification, and a lighting notification displayed on a dashboard of the vehicle, except for displaying the center position of the steering wheel on the steering wheel.

In an embodiment, the steering control method of the present disclosure may further include a steering wheel rotation controlling step (not shown) for rotating the steering wheel so that the center position of the steering wheel moves to a neutral position, if the center position of the steering wheel according to the rotation angle of the steering wheel does not correspond to the neutral position. In the steering wheel rotation controlling step, the steering control device may control to automatically rotate the steering wheel without manual rotation of the steering wheel by the driver of the vehicle so that the vehicle's steering direction becomes neutral state.

In another embodiment, when the position of the steering wheel corresponding to the rack position does not coincide with the physical center position of the steering wheel, the steering control device may stop the feedback to the output device for the rotation of the steering wheel, and may rotate the steering wheel so that the physical center position of the steering wheel coincides with the position of the steering wheel corresponding to the rack position. Here, the physical center position of the steering wheel refers to a position in a state in which the rack position and the position of the steering wheel are synchronized in designing the vehicle.

The signal outputting step and the steering wheel rotation controlling step as described above may be executed by the steering control device simultaneously with or before or after the steering wheel display step. That is, the signal outputting step and the steering wheel rotation controlling step may be performed independently of the steering wheel display step after the steering wheel rotation angle determination step.

In the steering reaction force providing step S1340 of the present disclosure, the steering control device provides the steering reaction force according to the rotation angle of the steering wheel. That is, the steering control device may provide the steering reaction force by determining the motor current according to the center position of the steering wheel and providing the corresponding motor current to the reaction force motor.

If the position of the steering wheel is in the neutral position, the motor current value is the smallest. In addition, as the position of the steering wheel rotates in the left or right direction, the motor current value increases. That is, the steering reaction force determined according to the motor current value is determined according to the position of the steering wheel, and as the position of the steering wheel is deflected in a specific direction, the steering reaction force increases. Therefore, the steering control device may determine the motor current value based on the position of the steering wheel determined according to the rack position detected after the ignition of the vehicle is turned on, and may control the steering motor using the corresponding motor current value to provide the steering reaction force.

The steering control method of the present disclosure, after the ignition of the vehicle is turned on, may detect the rack position of the output device, determine the rotation angle of the steering wheel corresponding to the rack position, display the center position of the steering wheel according to the rotation angle of the steering wheel on the steering wheel, and provide the steering reaction force according to the rotation angle of the steering wheel. Accordingly, even if the rack position or the position of the steering wheel is changed by an external force in a state in which the ignition of the vehicle is turned off, it is possible to synchronize the positions of the rack and the steering wheel. Furthermore, since information on the center position of the steering wheel changed according to the rack position is displayed on the steering wheel, a driver of a vehicle including the steering control device of the present disclosure can efficiently perform steering control.

In another aspect, the present disclosure discloses a steering control system. The steering control system of the present disclosure includes an output device for detecting a rack position after an ignition of a vehicle is turned on, an electronic control unit for determining a rotation angle of a steering wheel corresponding to the rack position, and an input device for displaying a center position of the steering wheel according to the rotation angle of the steering wheel on the steering wheel, and providing a steering reaction force according to the rotation angle of the steering wheel.

The input device receives a steering control signal for the vehicle from the driver of the vehicle, and an output device controls the wheels of the vehicle according to the steering control signal input from the input device.

Specifically, the input device, that is, a steering column unit may include a steering wheel, a steering shaft, a steering angle sensor for detecting a steering angle of the steering wheel, a torque sensor for detecting a torque of the steering shaft for the steering wheel, a reaction force motor providing a reaction torque according to the rotation of the steering wheel, etc. The output device may include a wheel, a rack, a steering output sensor capable of detecting the rotation angle of the wheel, a steering motor for generating assistance force to steer the wheel, a steering motor position sensor for detecting the position of the rotating shaft of the steering motor, a rack position sensor for detecting the position of a rack, and the like.

The electronic control unit, in hardware, may be implemented using at least one of the possible electrical configurations capable of processing data and performing other functions, such as controllers, micro-controllers, microprocessors (e.g., computers, etc.), and the like.

According to the steering control system of the present disclosure, the output device detects the rack position and transmits the detected rack position information to the electronic control unit after the ignition of the vehicle is turned on. The electronic control unit receives the rack position information from the output device, determines the rotation angle of the steering wheel corresponding to the rack position, and transmits the rotation angle information of the steering wheel to the input device. The input device displays the center position of the steering wheel according to the rotation angle of the steering wheel on the steering wheel, and provides a steering reaction force according to the rotation angle of the steering wheel. Accordingly, even if the position of the rack or the steering wheel is changed by an external force in a state in which the ignition of the vehicle is turned off, it is possible to synchronize the positions of the rack and the steering wheel. Furthermore, since information on the center position of the steering wheel changed according to the rack position is displayed on the steering wheel, a driver of a vehicle including the steering control system of the present disclosure can efficiently perform steering control.

The terms "system", "processor", "controller", "component", "module", "interface", "model", "unit", etc. described above generally refer to computer-related entity hardware, a combination of hardware and software, software, or software in execution. For example, the aforementioned elements may be, but are not limited to, a process run by a processor, a processor, a controller, a controlling processor, an object, a thread of execution, a program, and/or a computer. For example, both an application running on a controller or processor and a controller or processor can be an element. One or more elements may be disposed within a process and/or thread of execution, and elements may be located on one system or distributed to two or more systems.

Terms such as "include", "comprise" or "have" described above mean that the corresponding element may be embedded unless otherwise specified. Therefore, it should be construed as not excluding other elements, but may further include other elements. All terms, including technical or scientific terms, have the same meaning as commonly understood by one of ordinary skill in the art to which this disclosure belongs, unless otherwise defined. Commonly used terms, such as those defined in the dictionary, should be interpreted as being consistent with the meaning of the context of the related art, and should not be interpreted in an ideal or excessively formal meaning unless explicitly defined in the present disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATION

This application claims priority from Korean Patent Application No. 10-2019-0057367, filed on May 16, 2019, which is hereby incorporated by reference for all purposes as if fully set forth herein. In addition, if this patent application claims priority for countries other than the United States for the same reason as above, all the contents are incorporated into this patent application by reference.

The invention claimed is:

1. A steering control device comprising:
   a rack position detection unit for detecting a rack position of an output device after an ignition of a vehicle is turned on;
   a steering wheel rotation angle determination unit for determining a rotation angle of a steering wheel corresponding to the rack position;
   a steering wheel display unit for displaying, on the steering wheel, a center position of the steering wheel according to the rotation angle of the steering wheel; and
   a steering reaction force provision unit for providing a steering reaction force according to the rotation angle of the steering wheel,
   wherein
   the steering reaction force provision unit determines a current value based on a position of the steering wheel determined according to the rack position, and controls a steering motor using the current value to provide the steering reaction force,
   the steering wheel display unit displays the center position of the steering wheel on the steering wheel in one of a plurality of different colors according to the rotation angle of the steering wheel, and
   if the rack position is located at a one-side rack threshold and the steering wheel is rotated in a direction in which the rack position exceeds the one-side rack threshold, the steering wheel display unit displays on the steering wheel in a color different from the plurality of different colors.

2. The steering control device of claim 1, wherein the steering wheel rotation angle determination unit is configured to determine the rotation angle of the steering wheel based on the rack position, the one-side rack threshold, and a one-side steering wheel threshold.

3. The steering control device of claim 2, wherein the rotation angle of the steering wheel is determined to be less than or equal to the rotation angle of the steering wheel corresponding to the one-side rack threshold.

4. The steering control device of claim 1, wherein the steering wheel display unit is configured to
- determine a rotation angle range to which the rotation angle of the steering wheel belongs among N rotation angle ranges, and
- display the center position of the steering wheel on the steering wheel in a color of the rotation angle range to which the rotation angle of the steering wheel belongs.

5. The steering control device of claim 1, wherein the steering reaction force provision unit is configured to provide the steering reaction force equal to a rotation angle of the steering wheel corresponding to the one-side rack threshold.

6. The steering control device of claim 1, wherein the steering wheel display unit is configured to move a display position from the center position of the steering wheel to a neutral position so that the center position of the steering wheel according to the rotation angle of the steering wheel returns to the neutral position.

7. The steering control device of claim 1, further comprising:
- a signal output unit for outputting a signal indicating that the center position of the steering wheel does not correspond to a neutral position, in response to that the center position of the steering wheel according to the rotation angle of the steering wheel does not correspond to the neutral position.

8. The steering control device of claim 1, further comprising:
- a steering wheel rotation control unit for rotating the steering wheel to cause the center position of the steering wheel to move to a neutral position, in response to that the center position of the steering wheel according to the rotation angle of the steering wheel does not correspond to the neutral position.

9. A steering control method comprising:
- detecting a rack position of an output device after an ignition of a vehicle is turned on;
- determining a rotation angle of a steering wheel corresponding to the rack position;
- displaying, on the steering wheel, a center position of the steering wheel according to the rotation angle of the steering wheel; and
- providing a steering reaction force according to the rotation angle of the steering wheel, wherein
- providing the steering reaction force comprises determining a current value based on a position of the steering wheel determined according to the rack position, and controlling a steering motor using the current value to provide the steering reaction force,
- displaying on the steering wheel comprises
  - displaying the center position of the steering wheel on the steering wheel in one of a plurality of different colors according to the rotation angle of the steering wheel, and
  - displaying the center position of the steering wheel on the steering wheel in a color different from the plurality of different colors, if the rack position is located at a one-side rack threshold and the steering wheel is rotated in a direction in which the rack position exceeds the one-side rack threshold.

10. The steering control method of claim 9, wherein determining a rotation angle of the steering wheel comprises determining the rotation angle of the steering wheel based on the rack position, the one-side rack threshold, and a one-side steering wheel threshold.

11. The steering control method of claim 10, wherein the rotation angle of the steering wheel is determined to be less than or equal to the rotation angle of the steering wheel corresponding to the one-side rack threshold.

12. The steering control method of claim 9, wherein displaying on the steering wheel comprises
- determining a rotation angle range to which the rotation angle of the steering wheel belongs among N rotation angle ranges, and
- displaying the center position of the steering wheel on the steering wheel in a color of the rotation angle range to which the rotation angle of the steering wheel belongs.

13. The steering control method of claim 9, wherein displaying on the steering wheel comprises moving a display position from the center position of the steering wheel to a neutral position so that the center position of the steering wheel according to the rotation angle of the steering wheel returns to the neutral position.

14. The steering control method of claim 9, further comprising:
- outputting a signal indicating that the center position of the steering wheel does not correspond to a neutral position, in response to that the center position of the steering wheel according to the rotation angle of the steering wheel does not correspond to the neutral position.

15. The steering control method of claim 9, further comprising:
- controlling to rotate the steering wheel to cause the center position of the steering wheel to move to a neutral position, in response to that the center position of the steering wheel according to the rotation angle of the steering wheel does not correspond to the neutral position.

16. A steering control system comprising:
- an output device for detecting a rack position after an ignition of a vehicle is turned on;
- an electronic control unit for determining a rotation angle of a steering wheel corresponding to the rack position; and
- an input device for displaying a center position of the steering wheel according to the rotation angle of the steering wheel on the steering wheel, and providing a steering reaction force according to the rotation angle of the steering wheel, wherein
- the input device determines a current value based on a position of the steering wheel determined according to the rack position, and controls a steering motor using the current value to provide the steering reaction force, the input device displays the center position of the steering wheel on the steering wheel in one of a plurality of different colors according to the rotation angle of the steering wheel, and if the rack position is located at a one-side rack threshold and the steering wheel is rotated in a direction in which the rack position exceeds the one-side rack threshold, the input device displays on the steering wheel in a color different from the plurality of different colors.

\* \* \* \* \*